S. P. KINGSLEY.
Churn.
No. 65,234.
Patented May 28, 1867.
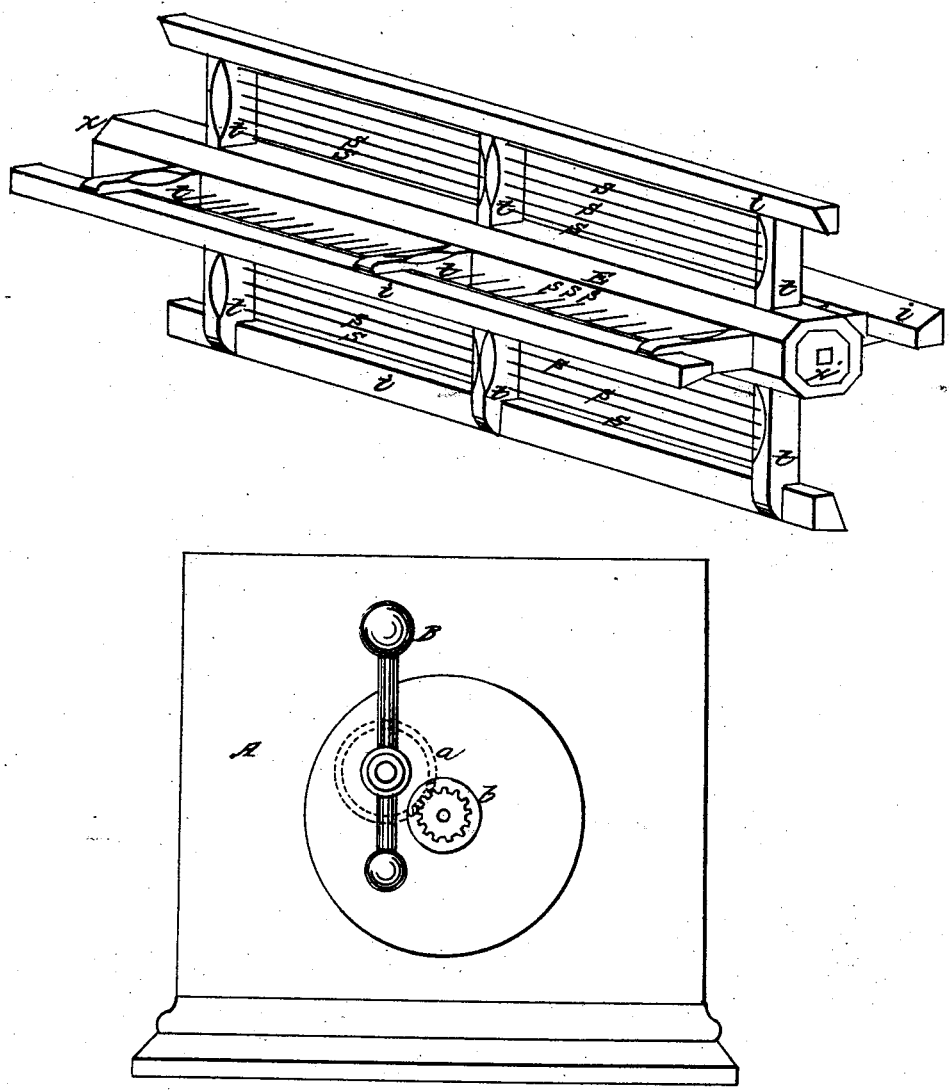
Witnesses:
Inventor:

United States Patent Office.

S. P. KINGSLEY, OF SPRINGFIELD, WISCONSIN.

Letters Patent No. 65,234, dated May 28, 1867.

CHURNS.

The Schedule referred to in these Letters Patent and making part of the same.

TO ALL WHOM IT MAY CONCERN:

Be it known that I, S. P. KINGSLEY, of Springfield, in the county of Dane, and in the State of Wisconsin, have invented certain new and useful Improvements in Churns; and do hereby declare that the following is a full, clear, and exact description thereof, reference being had to the accompanying drawings, and to the letters of reference marked thereon, making a part of this specification.

In the annexed drawings, A represents the churn-box, which may be of any suitable shape or material, having a curved bottom. Within this box is secured the dasher, which is placed in a horizontal manner, and operated by a crank, B, with suitable cog-wheels $a$ $b$, on the outer face of the box. The dasher of my churn is composed of a cylinder, E, having a series of bevelled arms, $i$ $i$ $i$, stationed a short distance from the circumference of said cylinder by means of the studs $t$ $t$ $t$. Running horizontally along the studs between the arms and the cylinder are several small wires $s$ $s$ $s$ $s$, which "whip" the cream when in operation, instead of breaking it, thereby causing the butter to be more easily and better formed than in the ordinary breaking process. The wires $s$ $s$ may either be placed upon the dasher in a horizontal or vertical manner, or transversely, as shown in the annexed drawings. In lieu of these wires may be used small wooden slits or sticks. It will be observed that the bevelled arms are placed upon the studs in the same direction, so that the cream is caught in the revolutions of the dasher by these arms and carried directly toward the cylinder. $x$ $x'$ represent the pivot sockets which secure the dasher within the box, and can be taken out of the said box whenever so desired.

Having thus fully described my invention, what I claim as new, and desire to secure by Letters Patent, is—

1. The arrangement of the dasher having cylinder E, bevelled arms $i$ $i$ $i$, and wires $s$ $s$, or their equivalents, when constructed and used in the manner and for the purposes specified.

2. The combination of the dasher, as constructed, with the churn-box A, when operating in the manner as set forth.

In testimony that I claim the foregoing I have hereunto set my hand and seal this 11th day of April, 1867.

S. P. KINGSLEY.

Witnesses:
   C. M. ALEXANDER,
   J. M. MASON.